United States Patent
Bauer

(10) Patent No.: US 6,794,321 B2
(45) Date of Patent: Sep. 21, 2004

(54) GLASS COMPOSITIONS FOR ULTRAFINE FIBER INFORMATION

(75) Inventor: Jon Frederick Bauer, Castle Rock, CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 10/097,320

(22) Filed: Mar. 14, 2002

(65) Prior Publication Data

US 2002/0193231 A1 Dec. 19, 2002

Related U.S. Application Data

(60) Provisional application No. 60/279,528, filed on Mar. 28, 2001.

(51) Int. Cl.[7] .......................... C03C 13/00; C03C 3/091
(52) U.S. Cl. .............................. 501/35; 501/36; 501/66; 501/67
(58) Field of Search .............................. 501/27, 35, 36, 501/59, 65–67

(56) References Cited

U.S. PATENT DOCUMENTS

| | | | | |
|---|---|---|---|---|
| 5,055,428 A | * | 10/1991 | Porter | 501/35 |
| 5,401,693 A | * | 3/1995 | Bauer et al. | 501/38 |
| 5,523,264 A | * | 6/1996 | Mattson | 501/35 |
| 5,616,525 A | * | 4/1997 | Rapp et al. | 501/35 |
| 5,622,903 A | * | 4/1997 | Rapp et al. | 501/35 |
| 5,932,499 A | * | 8/1999 | Xu et al. | 501/35 |
| 5,962,355 A | * | 10/1999 | Mattson | 501/36 |
| 5,981,414 A | * | 11/1999 | Bauer et al. | 501/38 |

* cited by examiner

Primary Examiner—Karl Group
Assistant Examiner—Elizabeth A. Bolden
(74) Attorney, Agent, or Firm—Robert D. Touslee

(57) ABSTRACT

Provided are glass compositions uniquely applicable for the preparation of ultrafine fibers for filtration and separation applications. The glasses meet all physical and chemical criteria, including that for biodissolution rate.

25 Claims, No Drawings

GLASS COMPOSITIONS FOR ULTRAFINE FIBER INFORMATION

CROSS-REFERENCE TO RELATED APPLICATIONS

The present application claims priority to Provisional U.S. Patent Application No. 60/279,528, filed Mar. 28, 2001, which is hereby incorporated by reference in its entirety.

BACKGROUND OF THE INVENTION

1. Field of the Invention

The present invention relates to glass compositions which are uniquely applicable to the preparation of ultrafine fibers for filtration and separation applications. Fiber made from the glasses disclosed exhibit the necessary properties of moisture resistance, chemical resistance, strength, and biosolubility.

2. Description of the Related Art

Glass forming compositions suitable for fiberization are typically restricted by their melt and end properties to conform to process specifications and product performance criteria. For example, in both rotary and flame attenuation processes, only certain values for high temperature viscosity (T at $10^3$ poise) and liquidus are acceptable. Moreover, such compositions must demonstrate adequate physical properties such as tensile strength and moisture resistance when formed into fibers by these processes. In addition, more recently, it has become increasingly more important that these fibers degrade at sufficiently high rates in the body, such that they pose little to no potential risk to humans if inhaled and can at least be demonstrated to have limited biological effects to laboratory animals when tested.

A good glass fiber forming composition should also have good "runability", i.e., the ability to be easily fiberized into long fibers of small diameter with good production rates and little or no shot. While there are many factors involved in this, not all of which have been clearly identified, it is believed that surface tension and lack of tendency for the melt phase to separate play key roles. In specific, it is desirable for a glass composition to have as low a surface tension as possible at fiberization temperatures (keeping in mind the other factors above), such that the work done in forming a unit area of surface is kept to a minimum.

All of these factors are especially important in the production of ultrafine fibers used to produce specialty papers and other media for air and liquid filtration applications. Such applications place some significant demands on the glass in terms of both fiberization and end properties.

Among the specific requirements of such glasses are the melting and fiberization temperatures. The glass must be capable of being melted and fiberized at temperatures low enough for the capability of the equipment and to attain reasonable (economic) production rates. This requires that the HTV value of the glass (temperature when the melt viscosity is 1000 poise) be less than 2200° F. (1204° C.), preferably less than 2000° F. (1093° C.), and the surface tension of the glass at 1652° F. (900° C.) be less than 315 dyne/cm.

The glass must not crystallize or devitrify in the melters, pots, bushings or anywhere in the system used to melt, contain, transport, or fiberize the glass. Crystallization impairs flow of melt to fiberization orifices. To prevent devitrification and provide a good working range for fiberization, the liquidus temperature of the glass must be at least 80° F. (44° C.) and preferably at least 150° F. (83° C.) below the HTV temperature.

The glass must not corrode or have adverse reactions with metal parts or refractories used to contain the melt or the newly-forming fiber. Also, the glass must be capable of being drawn into ultrafine diameters (as low as 0.2 μm) without breakage into short lengths.

The glass must not produce excessive volatilization during melting or fiberizing. Volatilization leads to compositional variations, increased corrosion of refractories, increased emissions, and, when volatiles condense, to unacceptable dust levels in product. As well, the glass must provide strength to the fiber—suitable to form fibers capable of being wet or dry (air) processed into papers or felts and meet all of the requirements (tensile, elongation) required for the paper product.

Because of its high specific surface area, the glass must also be sufficiently chemically durable, particularly with regard to ambient atmospheric moisture, so that little to no deterioration in fiber strength occurs with time during packaging, shipping, and storage prior to use in papermaking process. The moisture resistance of a glass fiber can be correlated with its thermodynamic tendency to react with water as measured by its free energy of hydration. For nearly all commercial glass fiber, this value is negative, indicating that the fibers will over time react. However, it is the rate at which the reaction occurs that is critical. For fiber to perform adequately and preserve tensile properties, the free energy of hydration should not be less than (more negative than) -4.5 kcal/mole. Loss in fiber strength also correlates with increase in fiber surface area as measured by BET methods (using krypton). After exposure of fibers to 122° F. (50° C.) for 72 hours, the change in surface area should be less than 10%. The glass must also be sufficiently durable and resistant to moisture attack after contact with whitewaters or other media used in the papermaking process, so that little to no deterioration occurs with time after fiber is in paper product.

Because the fiber is of very fine diameter and capable of being respired, it must also degrade in the body at a rate that is sufficiently rapid so as not to induce respiratory diseases, especially chronic diseases such as emphysema or cancer. Measured in vitro dissolution rates for the fiber in simulated physiological saline ($k_{dis}$) must be greater than 100 ng/cm² hr.

The glass fibers must also be leachable in paper making media such as acid whitewaters such that hydrolytic bonds can form between leached fiber surfaces when the paper is dried. Such bonds provide strength and structural integrity in the final product. However, too great a leach rate can leave the fiber with a porous surface structure which is too susceptible to moisture attack after the paper is formed. Formation of such bonds can be correlated with bulk silica content of the glass. For good gel bonding the silica content must be at least 58 mole %. The glass fibers must also show good performance in handsheets, both in initial tensile strength and in loss in tensile strength over time. This is evaluated by determining load to failure at a gauge length of 4" (10.2 cm) of mechanically formed handsheets with a nominal basis weight of 0.02 lb/sq. ft. (9.6 mg/cm²). For handsheets made of fiber with a 0.3 μm geometric mean diameter, initial tensile strengths should be at least 3.4 lbs./in. with no statistically significant loss in tensile strength after aging at 95° F. (35° C.) and 95% relative humidity for up to 168 hrs.

The glass fibers must also show good performance in doubly folded handsheets, both in initial tensile strength and in loss in tensile strength over time. This is evaluated by determining load to failure at a gauge length of 4" (10.2 cm) for the handsheets whose properties are defined above. For handsheets made of fiber with a 0.3 μm mean diameter, initial folded tensile strengths should be at least 1.8 lbs./in. Tensile strength after aging at 95° F. (35° C.) and 95% relative humidity for up to 168 hrs should show an exponential decay with a t ½ of no less than 250 days. The glass fibers must also show good performance in mat elongation, both as measured in direct and folded tensile tests as described above. Elongation measures the integrity of the fiber to fiber bond and can be related to both manufacturability of the paper and its performance in product (e.g., pleating, etc.). For handsheets made of fiber with a 1 μm mean diameter and basis weight as defined above, elongation in either test should be less than 2% at failure. Change in elongation upon aging under the conditions above should be less than 30%.

The achievement of producing ultrafine glass fibers with the requisite strength, chemical and moisture resistance, while also exhibiting acceptable biosolubility is quite challenging. The industry would find such fiberglass quite useful. Accordingly, glass compositions suitable for efficiently making ultrafine fibers for use in specialty papers and particularly in media for air and liquid filtration applications, where the requested biosolubility and strength performance are realized, are greatly desired.

SUMMARY OF THE INVENTION

The present invention defines glass compositions which are uniquely applicable to the preparation of ultrafine fibers for filtration and separation applications. The market for these products is presently served by glass compositions that perform well and meet all of the criteria defined above with the exception of dissolution rate in simulated physiological saline. The glasses of the present invention meet all of these criteria including that for dissolution rate. The compositional range in which glass fibers meeting these criteria can be formed is as follows in mole %:

|  | General | Preferred |  |
|---|---|---|---|
| $SiO_2$ | 58 to 62 | 58 to 62 |  |
| $ZrO_2$ | 0 to 4 | 0 to 4 |  |
| $TiO_2$ | 0 to 4 | 0 to 4 |  |
| $Al_2O_3$ | 0.1 to 3 | 1 to 3 | (most preferred 1.5 to 2.5) |
| $B_2O_3$ | 10 to 18 | 10 to 14 |  |
| CaO | 0 to 9 | 1 to 5 |  |
| MgO | 0 to 5 | 0 to 5 |  |
| BaO | 0 to 3 | 0 to 3 |  |
| ZnO | 0 to 5 | 0 to 5 |  |
| $Na_2O$ | 8 to 17 | 12 to 16 |  |
| $K_2O$ | 0 to 5 | 0.5 to 2.5 |  |
| $Li_2O$ | 0 to 4 | 0 to 4 | (most preferred 1 to 3) |
| $F_2$ | 0 to 2 | 0 to 2 |  |

The glass compositions of the present invention are particularly adapted to provide glass fiber media which is useful for fabrication of HEPA air filtration systems for clean-room installations. Glass HEPA media are made from a blend of fine diameter glass fibers ranging from 0.2 to 2 micron. These products are rated for high filtration efficiency values while maintaining reasonably low pressure-drop characteristics.

The glass composition and fibers of the present invention exhibit stability in wet acidic environments and resistance to moisture attack during storage under humid ambient conditions, which are two important properties of glass fibers used in HEPA filtration applications. In addition, the glasses of the present invention have viscosity and liquidus temperature properties that are compatible with fiberglass manufacturing technologies used to produce fine diameter fibers, particularly flame attenuation processes. The glass compositions and fibers of the present invention also exhibit excellent biosolubility such that the fibers degrade at a high rate in the body if inhaled, which is a property that is becoming increasingly more important.

Among other factors, it has been found that the glass compositions of the present invention can be used to prepare glass fibers, by any method, including flame attenuation or rotary, which exhibit the necessary chemical and strength properties, as well as processing characteristics, to allow for the efficient preparation of the fibers for use in paper and filtration products. Particular application is found for ultrafine fibers in filter products. Moreover, the glass compositions permit such chemical and strength characteristics while also offering good biosolubility. It is through a balance of the components of the glass composition that such a balance of properties is possible, which balance is reflected in the compositions of the present invention.

DETAILED DESCRIPTION OF THE PREFERRED EMBODIMENTS

The glass compositions of the present invention from which glass fibers, particularly ultrafine glass fibers, can be prepared exhibiting the requisite strength, chemical and moisture resistance, and biosolubility, is as follows, expressed in terms of mole percent of the glass composition:

| $SiO_2$ | 58 to 62 |
| --- | --- |
| $ZrO_2$ | 0 to 4 |
| $TiO_2$ | 0 to 4 |
| $Al_2O_3$ | 0.1 to 3 |
| $B_2O_3$ | 10 to 18 |
| CaO | 0 to 9 |
| MgO | 0 to 5 |
| BaO | 0 to 3 |
| ZnO | 0 to 5 |
| $Na_2O$ | 8 to 17 |
| $K_2O$ | 0 to 5 |
| $Li_2O$ | 0 to 4 |
| $F_2$ | 0 to 2 |

The foregoing compositions offer an excellent balance in properties when used to prepare glass fibers.

In a preferred embodiment, the glass composition and fibers prepared therefrom comprise in mole %:

| $SiO_2$ | 58 to 62 |  |
|---|---|---|
| $ZrO_2$ | 0 to 4 |  |
| $TiO_2$ | 0 to 4 |  |
| $Al_2O_3$ | 1 to 3 | (most preferred 1.5 to 2.5) |
| $B_2O_3$ | 10 to 14 |  |
| CaO | 1 to 5 |  |
| MgO | 0 to 5 |  |
| BaO | 0 to 3 |  |
| ZnO | 0 to 5 |  |
| $Na_2O$ | 12 to 16 |  |
| $K_2O$ | 0.5 to 2.5 |  |
| $Li_2O$ | 0 to 4 | (most preferred 1 to 3) |
| $F_2$ | 0 to 2 |  |

The procedure used to evaluate biodissolution rate is similar to that described in Law et al. (1990). The procedure consists essentially of leaching a 0.5 gram aliquant of the candidate fibers in a synthetic physiological fluid, known as Gamble's fluid, or synthetic extracellular fluid (SEF) at a temperature of 37° C. and at a rate adjusted to achieve a ratio of flow rate to fiber surface area of 0.02 cm/hr to 0.04 cm/hr for a period of up to 1,000 hours duration. Fibers are held in a thin layer between 0.2 µm polycarbonate filter media backed by plastic support mesh and the entire assembly placed within a polycarbonate sample cell through which the fluid may be percolated. Fluid pH is regulated to 7.4±0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant could be calculated for each fiber type from the relation:

$$k=[d_o\rho(l-(M/M_o)^{0.5})]/2t$$

where k is the dissolution rate constant in SEF, $d_o$ the initial fiber diameter, $\rho$ the initial density of the glass comprising the fiber, $M_o$ the initial mass of the fibers, M the final mass of the fibers ($M/M_o$=the mass fraction remaining), and t the time over which the data was taken. Details of the derivation of this relation is given in Leineweber (1982) and Potter and Mattson (1991). Values for k may be reported in $ng/cm^2/hr$ and preferably exceed a value of 100. Replicate runs on several fibers in a given sample set show that k values are consistent to within 3 percent for a given composition.

Data obtained from this evaluation can be effectively correlated within the sample set chosen—dissolution data used to derive k's were obtained under identical conditions of initial sample surface area per volume of fluid per unit time, and sample permeability. Data was obtained from runs of up to 30 days to obtain an accurate representation of the long term dissolution of the fibers. Preferred biodissolution rate constants in $ng/cm^2/hr$ are greater than 100 $ng/cm^2/hr$, and more preferably greater than 110 $ng/cm^2/hr$, most preferably greater than 130 $ng/cm^2/hr$.

The glass fibers of the present invention can thereby offer one the benefits of a core/sheath structure fiber in terms of moisture resistance, while also enjoying good biodissolution, when the glass fibers of the present invention are prepared by a process involving flame attenuation, such as the rod method, direct melt method or pot and marble method, with application to the pot and marble method being most preferred. As mentioned previously, the primaries in a flame attenuation process are exposed to higher temperatures than in a rotary or continuous filament process. The primaries are contacted with a sufficiently high temperature to create a shell due to the loss of the more volatile compounds of the glass composition from the outside of the fibers. The resulting fiber has an outside shell which has a different composition than the fiber interior.

The primaries are typically drawn from a multitude of orifices by sets of pull rolls or other relatively slow speed drawing devices that both draw the primaries in a controlled way and also feed the primaries into the flame attenuation zone. Synchronized pairs or sets of rollers are used to draw all primaries at the same speed.

The primaries are drawn through orifices that can be arranged in either a circular array or a rectangular one. The circular array generally occurs in the bottom of a super alloy cylindrical pot, which is used to remelt previously melted glass in marble form. This variation, known as pot and marble, has the cylindrical pot, with rings of orifices in the bottom and an external combustion chamber around the sides of the pot. Marbles at ambient temperature are fed into the pot and are heated using radiant heat from the exterior combustion chamber. The marbles fuse and form a molten pool above the orifices from which the primaries are drawn.

Orifices may also be arranged in rows in the bottom of bushings, which typically are rectangular solid reservoir designs of electrically heated precious metal or super alloy construction. The bushings may be designed to remelt glass in marble or other geometric forms, much as is done in the pot and marble process described above. Alternately, the bushings may be fed with molten glass from small glass melting units which were fed with batch, which is a mixture of the appropriate raw materials for the glass composition desired. The batch is fused in the melting units by the application of either electrical energy or fossil fuel fire burners. After melting and refining, the molten glass bath's temperature is cooled in a controlled way in order to supply the bushings with glass at the appropriate temperature.

While preparation of the glass fibers of the present invention by flame attenuation is preferred, the glass fibers can be prepared by any conventional method, including the rotary process. The process for preparing the glass fibers will be dictated by the ultimate application or product in which the fiber is to be used. Some variations within the ranges of the compositions may also be necessary to optimize the glass for a particular application.

The applications for which the ultrafine fibers are suitable include many specialty paper and separation filters. The fibers of the present invention are not only suitable for flame attenuation or rotary processing into fine glass fibers, but the fibers made from the compositions of the present invention are also appropriately resistant to acid white water attack and the resulting specialty fiberglass papers exhibit sufficient humidity resistance to withstand handling and pleating into HEPA filters.

The specialty paper making process used to manufacture HEPA media involves dispersing the glass fibers in an acidic suspension referred to as "white water" by paper makers. As previously described, glass fibers suitable for HEPA filters must have properties which allow them to function adequately in this environment. A simulation for the entire paper-making process is based upon making "handsheets" from glass fibers having mean fiber diameters of about 0.7 microns and prepared from the various test glass compositions being evaluated. These handsheets are a surrogate for actual commercially prepared specialty papers. Specimens for tensile testing are cut from the hand sheets and tested for tensile strength as a function of exposure time under controlled humidity conditions. Both straight tensile strength and folded tensile strength tests are typically made, the latter being used to simulate the pleating operation in filter manufacture. The size and amount, as well as the nature, of the "acid bonds" formed during the wet white water process determines the tensile strength of the fiberglass paper sheets produced on the specialty paper-making equipment. It is desirable that a tacky hydrosilica gel layer be formed at the fiber surface during the wet white water process as a result of the weak acid attack, by a typically pH2.0–pH3.0 $H_2SO_4$ solution. At the fiber junctions, such hydrosilica gel layers promote the formulation of desirable bonding between glass fibers to give the handsheets or papers good mechanical strength.

Straight tensile strength (zero humidity exposure) should correlate well with the level of ions leached from the fibers by the acid white water. If the fibers release too small an amount of ions, the bonding between fibers is weak and initial tensile strength is too low. If the fibers are too severely attacked, the fibers are weakened and easily broken, with resulting handsheet tensile strength again too low.

Therefore, acceptable HEPA glass compositions can be characterized by an optimum level of fiber attack by the acid white water, as determined by hand sheet testing results. After exposure to the acidic paper-making conditions, the resulting fiberglass papers must withstand atmospheric humidity during filter manufacture and while in subsequent service as filtration media.

The glass compositions of the present invention have properties that allow them to be fiberized by conventional flame-attenuation processes known in the glass-making art. Such processes are preferred, as discussed above, particularly for filter applications because they produce the fine diameter glass fibers required for HEPA air filtration. In some cases, however, the slightly coarser fibers often used in combination with the fine fibers in some air filters are produced by conventional rotary fiberization technologies. Therefore, the preferred glass compositions of the present invention can be used in both processes. Specifically, the glasses of the present invention have a viscosity that is sufficiently low at fiberization temperatures to realize reasonable fiberization rates and efficiencies in flame attenuation processes and to avoid the use of expensive precious metal alloys (typically Pt—Rh alloy) as the bushing, pot or spinner material.

The preferred fibers for the HEPA filter media of the present invention are flame attenuated fibers. These fibers are formed by drawing continuous primary glass filaments from a bushing, rod, or pot and introducing these continuous primary glass filaments into the high energy gaseous blast of a flame attenuation burner, such as a Selas burner, where the continuous filaments are reheated, attenuated and formed into fine diameter staple or finite length glass fibers of the desired diameter, as described in general previously.

The glasses of the present invention preferably have an HTV less than 2200° F., and ideally less than 2000° F. in order to be suitable for flame attenuation. Glasses with HTV values of greater than 2200° F. are generally processed inefficiently in flame attenuation processes at low production rates with the use of Pt—Rh alloy as busing materials.

Preferred glass compositions have a liquidus temperature that is at least 150° F., more preferably 250° F. below the HTV, and most preferably from 250° F. to 300° F. below the HTV, in order to avoid devitrification (crystallization) problems during non-rotary, pot and marble or other flame attenuation fiberization processes.

Having generally described this invention, a further understanding can be obtained by reference to certain specific examples which are provided herein for purposes of illustration only and are not intended to be limiting unless otherwise specified.

Specific examples of glass fibers with compositions within the above ranges and meeting all property and performance criteria discussed above are given below:

EXAMPLE 1

| A fiber with the composition (in mole %): | |
|---|---|
| $SiO_2$ | 61.5 |
| $Al_2O_3$ | 2.0 |
| $B_2O_3$ | 10.5 |
| CaO | 2.0 |
| BaO | 3.0 |
| ZnO | 4.0 |
| $Na_2O$ | 15.0 |
| $K_2O$ | 1.0 |

| -continued | |
|---|---|
| A fiber with the composition (in mole %): | |
| $F_2$ | 1.0 |
| HTV: | 1780° F. (971° C.) |
| Liquidus: | 1200° F. (661° C.) |
| Surface tension @ 900° C.: | 297 dyne/cm |
| $k_{dis}$: | 327 ng/cm² hr |
| Moisture resistance ($\Delta$ G hydration): | −3.8 kcal/mole |

EXAMPLE 2

| A fiber with the composition (in mole %): | |
|---|---|
| $SiO_2$ | 60.0 |
| $ZrO_2$ | 2.0 |
| $TiO_2$ | 2.0 |
| $Al_2O_3$ | 1.5 |
| $B_2O_3$ | 13.5 |
| CaO | 2.0 |
| MgO | 2.0 |
| $Na_2O$ | 14.5 |
| $K_2O$ | 1.5 |
| $F_2$ | 1.0 |
| HTV: | 1840° F. (1004° C.) |
| Liquidus: | 1311° F. (711° C.) |
| Surface tension @ 900° C.: | 280 dyne/cm |
| $k_{dis}$: | 207 ng/cm² hr |
| Moisture resistance ($\Delta$ G hydration): | −3.5 kcal/mole |

Having now fully described the invention, it will be apparent to one of ordinary skill in the art that many changes and modifications can be made thereto without departing from the spirit or scope of the invention as set forth herein.

What is claimed is:

1. A glass composition useful in preparing glass fibers, the composition comprising, in mole %,

| $SiO_2$ | 58 to 62 |
|---|---|
| $ZrO_2$ | 0 to 4 |
| $TiO_2$ | 0 to 4 |
| $Al_2O_3$ | 0.1 to 3 |
| $B_2O_3$ | 10 to 18 |
| CaO | 0 to 9 |
| MgO | 0 to 5 |
| BaO | 0 to 3 |
| ZnO | 0 to 5 |
| $Na_2O$ | 8 to 17 |
| $K_2O$ | 0 to 5 |
| $Li_2O$ | 0 to 4 |
| $F_2$ | 0 to 2, | with the glass fibers prepared by the glass composition exhibiting a moisture resistance not less than −4.5 kcal/mole.

2. A glass composition useful in preparing glass fibers, the composition comprising, in mole %,

| $SiO_2$ | 58 to 62 |
|---|---|
| $ZrO_2$ | 0 to 4 |
| $TiO_2$ | 0 to 4 |
| $Al_2O_3$ | 1 to 3 |
| $B_2O_3$ | 10 to 14 |
| CaO | 1 to 5 |
| MgO | 0 to 5 |

-continued

|     |          |
| --- | -------- |
| BaO | 0 to 3   |
| ZnO | 0 to 5   |
| Na$_2$O | 12 to 16 |
| K$_2$O | 0.5 to 2.5 |
| Li$_2$O | 0 to 4 |
| F$_2$ | 0 to 2,  | with the glass fibers prepared by the glass composition exhibiting a moisture resistance not less than −4.5 kcal/mole.

3. A glass fiber prepared from a glass composition comprising in mole %

|        |          |
| ------ | -------- |
| SiO$_2$ | 58 to 62 |
| ZrO$_2$ | 0 to 4   |
| TiO$_2$ | 0 to 4   |
| Al$_2$O$_3$ | 0.1 to 3 |
| B$_2$O$_3$ | 10 to 18 |
| CaO    | 0 to 9   |
| MgO    | 0 to 5   |
| BaO    | 0 to 3   |
| ZnO    | 0 to 5   |
| Na$_2$O | 8 to 17  |
| K$_2$O  | 0 to 5   |
| Li$_2$O | 0 to 4   |
| F$_2$   | 0 to 2,  | with the glass fiber exhibiting a moisture resistance not less than −4.5 kcal/mole.

4. The glass fiber of claim 3, wherein the glass composition comprises in mole %

|          |          |
| -------- | -------- |
| SiO$_2$  | 61.5     |
| Al$_2$O$_3$ | 2.0   |
| B$_2$O$_3$ | 10.5   |
| CaO      | 2.0      |
| BaO      | 3.0      |
| ZnO      | 4.0      |
| Na$_2$O  | 15.0     |
| K$_2$O   | 1.0      |
| F$_2$    | 1.0,     |
|          | and has the following properties: |
| HTV:     | 1780° F. (971° C.) |
| Liquidus: | 1200° F. (661° C.) |
| Surface tension @ 900° C.: | 297 dyne/cm |
| k$_{dis}$: | 327 ng/cm$^2$ hr |
| Moisture resistance (Δ G hydration): | −3.8 kcal/mole. |

5. The glass fiber of claim 3, wherein the glass composition comprises in mole %

|          |      |
| -------- | ---- |
| SiO$_2$  | 60.0 |
| ZrO$_2$  | 2.0  |
| TiO$_2$  | 2.0  |
| Al$_2$O$_3$ | 1.5 |
| B$_2$O$_3$ | 13.5 |
| CaO      | 2.0  |
| MgO      | 2.0  |
| Na$_2$O  | 14.5 |
| K$_2$O   | 1.5  |
| F$_2$    | 1.0, |
|          | and has the following properties: |
| HTV:     | 1840° F. (1004° C.) |
| Liquidus: | 1311° F. (711° C.) |
| Surface tension @ 900° C.: | 280 dyne/cm |
| k$_{dis}$: | 207 ng/cm$^2$ hr |
| Moisture resistance (Δ G hydration): | −3.5 kcal/mole. |

6. The glass composition according to claim 1 having an HTV of less than 2200° F.

7. The glass composition according to claim 1 having an HTV of less than 2000° F.

8. The glass composition according to claim 1 having a liquidus temperature at least 250° F. below said HTV.

9. The glass composition according to claim 1 having a liquidus temperature at least 350° F. below said HTV.

10. The glass composition according to claim 1 having acid white water resistance sufficient to lose less than 18,000 ppb total ions when dissolved in pH 2.5 sulfuric acid solution for an hour at room temperature.

11. Glass fibers prepared from the glass composition of claim 1, wherein the (k$_{dis}$) is greater than 100 ng/cm$^2$ hr.

12. The glass fibers of claim 11, wherein the (k$_{dis}$) is greater than 130 ng/cm$^2$ hr.

13. Glass fibers prepared from the glass composition of claim 2, wherein the (k$_{dis}$) in greater than 100 ng/cm$^2$ hr.

14. The glans fibers of claim 13, wherein the (k$_{dis}$) is greater than 130 ng/cm$^2$ hr.

15. A filtration medium comprising the glass fibers of claim 11.

16. A filtration medium comprising the glass fibers of claim 12.

17. A filtration medium comprising the glass fibers of claim 13.

18. A filtration medium comprising the glass fibers of claim 14.

19. A ifiter product comprising the filtration medium of claim 11, wherein the filter product is a HEPA air filtration product.

20. The glass of claim 1, wherein glass fibers prepared therefrom exhibit a moisture resistance not less than −3.8 kcal/mole.

21. The glass composition of claim 2, wherein glass fibers prepared therefrom exhibit a moisture resistance not less than −3.8 kcal/mole.

22. The glass fiber of claim 3, wherein the glass fiber exhibits a moisture resistance not less than −3.8 kcal/mole.

23. The glass composition of claim 1, wherein the glass fibers prepared therefrom exhibit a moisture resistance not less than −3.5 kcal/mole.

24. The glass composition of claim 2, wherein glass fibers prepared therefrom exhibit a moisture resistance not less than −3.5 kcal/mole.

25. The glass fiber of claim 3, wherein the glass fiber exhibits a moisture resistance not less than −3.5 kcal/mole.

* * * * *